United States Patent [19]

Puglisi

[11] Patent Number: 4,467,020
[45] Date of Patent: Aug. 21, 1984

[54] RECHARGEABLE LEAD-HYDROGEN ELECTROCHEMICAL CELL

[75] Inventor: Vincent J. Puglisi, Waterford, Conn.

[73] Assignee: Yardney Corporation, Pawcatuck, Conn.

[21] Appl. No.: 459,841

[22] Filed: Jan. 21, 1983

[51] Int. Cl.³ .......................................... H01M 12/08
[52] U.S. Cl. ..................................... 429/101; 429/228
[58] Field of Search ................... 429/101, 225, 228, 27

[56] References Cited

U.S. PATENT DOCUMENTS

| | | | |
|---|---|---|---|
| 3,850,694 | 11/1974 | Dunlop et al. | 429/27 |
| 4,107,395 | 8/1978 | Ommering et al. | 429/27 |
| 4,369,235 | 1/1983 | Bursell | 429/27 |

Primary Examiner—Donald L. Walton
Attorney, Agent, or Firm—Donald E. Nist

[57] ABSTRACT

An improved rechargeable lead-hydrogen electrochemical cell is provided which comprises a cell stack secured to a retainer and disposed within a pressure vessel containing hydrogen gas. The stack includes a positive electrode comprising lead oxide, a pair of gas-porous negative electrodes containing a catalyst, a pair of separators and a pair of gas screens. The stack components are saturated with sulfuric acid electrolyte. Each of the negative electrodes has a separator disposed on one side thereof and a gas screen disposed on the opposite side thereof. The pressure vessel contains a gas inlet, and electrical leads connect to, respectively, the positive and negative electrodes and exit the pressure vessel. In the charged form, the cell reactants exist as lead oxide and hydrogen gas. When the cell is discharged, the lead oxide is reduced to lead sulfate and the hydrogen gas is oxidized at a catalytic surface to hydrogen ion. The cell has a lower cost with fewer technical problems, has a higher specific energy density and has a superior performance, relative to conventional metal hydrogen cells.

10 Claims, 5 Drawing Figures

RECHARGEABLE LEAD-HYDROGEN ELECTROCHEMICAL CELL

BACKGROUND OF THE INVENTION

1. Field of the Invention

The present invention generally relates to electrochemical cells and more particularly to a novel lead-hydrogen electrochemical cell.

2. Prior Art

During the 1960's, considerable activity was devoted to the development of electrochemical fuel cells. These primary type energy devices typically utilized hydrogen and oxygen as fuels and employed gas diffusion types of electrodes. In the early 1970's, experimenters refined hydrogen gas diffusion electrochemistry and coupled that while existing nickel oxide electrode technology or silver electrode technology to provide novel nickel-hydrogen and silver-hydrogen cells. The nickel-hydrogen cell was successful as an aerospace energy storage device. However, that cell is relatively costly per unit of energy provided by the cell. The silver-hydrogen cell has been less successful because of the high cost of the silver and because of technical problems which limit the life and ease of use of the cell.

Lead-acid electrochemical systems have been known for 100 years. They are of low cost and have reasonable performance, but have the disadvantages of low energy density and poor low temperature performance.

There remains a need for an improved electrochemical cell which is inexpensive to produce, has fewer technical problems than, for example, the silver-hydrogen cell and has higher specific energy density and superior performance characteristics than are exhibited by the lead-acid cell.

SUMMARY OF THE INVENTION

The novel lead-hydrogen electrochemical cell of the present invention satisfies all of the foregoing needs. The cell is substantially as set forth in the Abstract above. Thus, the cell is capable of providing a high voltage over a long cycle life and a long calendar life, is maintenance free, has a high specific energy, has dry charge capabilities, is fabricated of low cost materials and is therefore useful for a variety of commercial applications, and has the other advantages which are shared with the other metal-hydrogen electrochemical systems. The cell's high voltage, for example, 1.58 volts, is compared to about 1.22 volts for a nickel-hydrogen cell and 1.10 volts for a silver-hydrogen cell when discharged at the C/2 rate. The cell has a life in excess of 2,000 cycles at 80% DOD, and a calendar life of five or more years.

The positive electrode of the cell comprises lead dioxide while the negative electrodes are gas porous and contain active catalyst which comprises activated carbon, platinum, palladium or other noble metal in small concentration but with high surface area. The separators for the cell can be, for example, fiberglass, polymeric material or the like and the electrolyte preferably is aqueous sulfuric acid. The gas screens are preferably expanded porous polymers while the pressure vessel is preferably stainless steel. The arrangement of the components in the cell stack is such that each negative electrode has one of the separators against one side of it and one of the gas screens against the opposite side of it. It will be understood that although the most simple cell stack consists of one positive electrode and one pair each of negative electrodes, separators and gas screens, with the stack saturated with electrolyte and disposed in a retainer in the pressure vessel, the stack could and most often does include additional sets of stack components.

Additional features of the electrochemical cell are set forth in the following detailed description and accompanying drawings.

DRAWINGS

DETAILED DESCRIPTION

Figure 1:
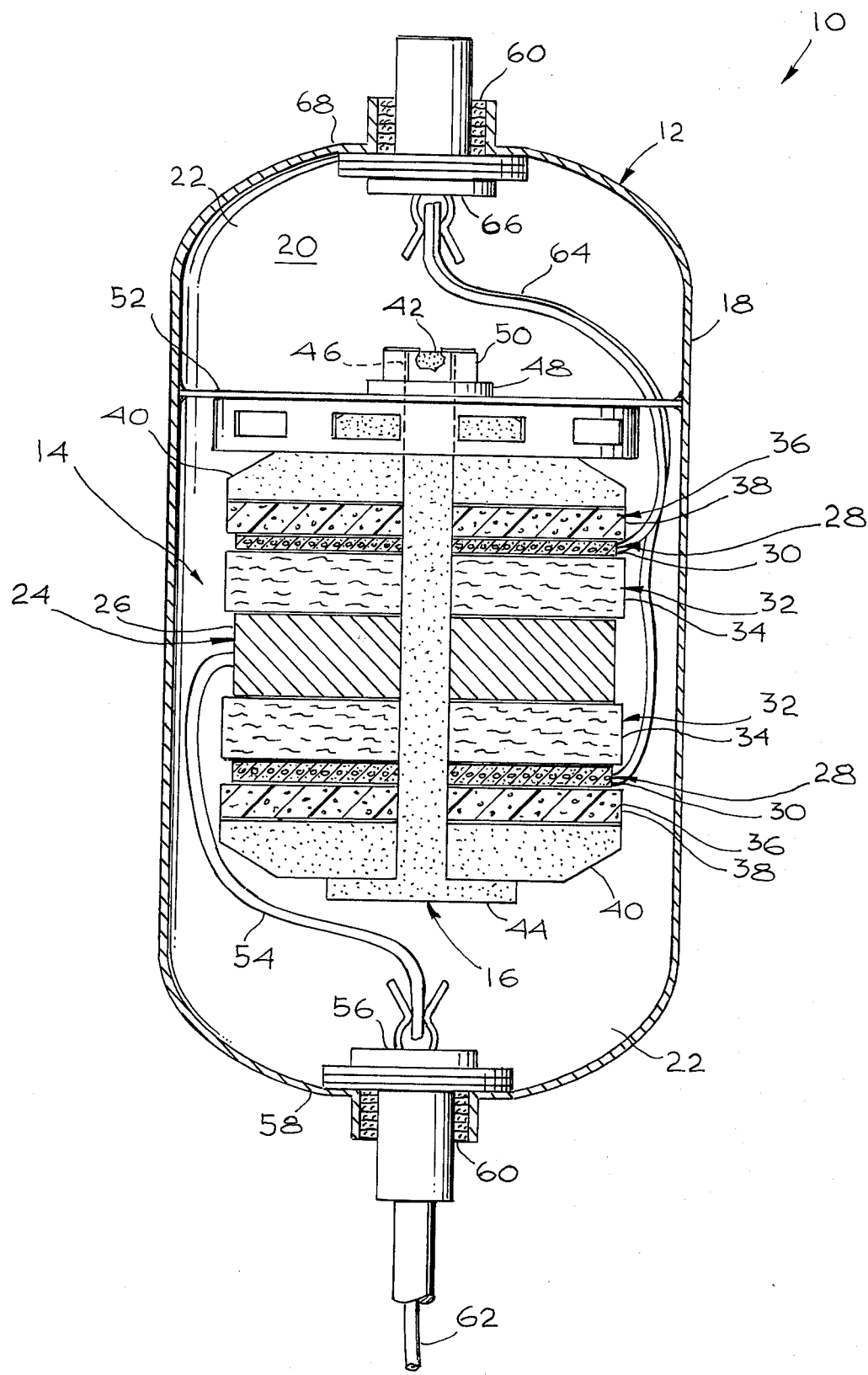
FIG. 1 is a schematic cross section of a first preferred embodiment of the improved lead-hydrogen electrochemical cell of the present invention.
Figure 2:
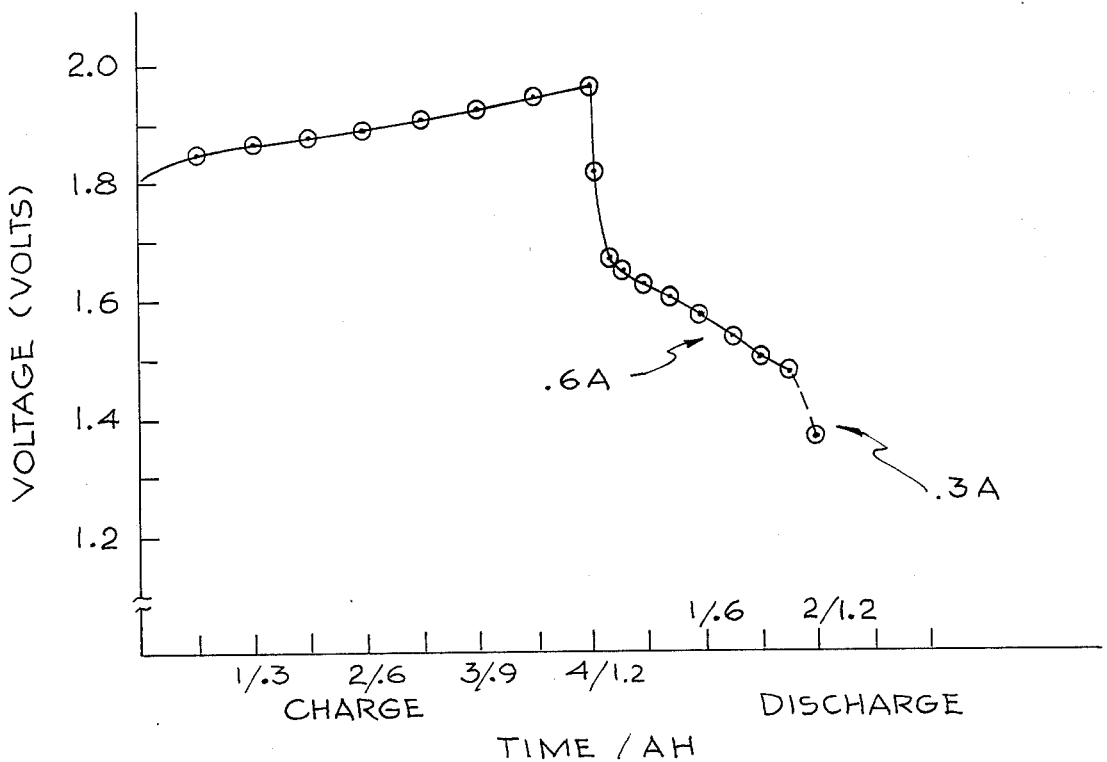
FIG. 2 is a graph depicting the voltage characteristics of the cell of FIG. 1 plotted against time for a typical charge-discharge cycle.

FIGS. 1 and 2

A first preferred embodiment of the improved lead-hydrogen electrochemical cell of the present invention is schematically depicted in cross section in FIG. 1. The cell depicted is substantially the same as a test cell which was used to generate the test data illustrated in FIG. 2 herein. Thus, cell 10 is shown which comprises a pressure vessel 12 of stainless steel or the like and, for example, having the following dimensions: 3.5 inch diameter and 6.5 inch height, with a wall thickness of about 0.025 inch. The pressure vessel has a cell stack 14 supported therein on a retainer 16 secured to the side wall 18 of vessel 12.

Hydrogen gas 20 is disposed in vessel 12, specifically within the open space 22 provided in vessel 12. It will be noted that stack 14 is supported by retainer 16 in vessel 12 such that space 22 is annular of and above and below stack 14.

Stack 14 is generally cylindrical and includes a positive electrode 24 comprising a disc-like sheet 26 of lead dioxide. Sheet 26 has, for example, the following dimensions: thickness 0.055 inch; diameter 3.0 inch. Stack 14 also includes a pair of disc-like gas-porous negative electrodes 28 containing catalyst (not shown) for cell 10.

Typically, each negative electrode 28 comprises a composite sheet 30, the components of which include a thin porous film (e.g. 3 mil) of a hydrophobic polymer such as tetrafluoroethylene and a wire screen of a suitable metal such as nickel plated with gold or platinum. The screen usually has a size of about 3/0 (0.125 inch diameter wire) to about 5/0 (0.050 inch diameter wire). The screen is pressed into one side of the hydrophobic film, and a layer of moisture absorbent particles of carbon or graphite is disposed on the free side of the screen and embedded through the pores thereof into the polymer film to form a gas-porous layer. The particle layer can be, for example, about 0.002 inch to about 0.030 inch thick and contain a small concentration, for example, of about 0.5 to about 20 mg/cm$^2$ of catalyst for the cell. The catalyst comprises platinum, palladium or another noble metal deposited on the particles. Electrode 28 typically is fabricated by pressing the wire screen into the tetrafluoroethylene or other polymer sheet, then depositing the catalyst-bearing carbon particles layer, as indicated, on the opposite side of the screen, pressing the layer into the sheet and then sintering the sandwich to a unitary product.

Instead of the described negative electrode, a comparable electrode can be formed by, for example, substituting a slurry of about 70 to about 85 wt. % of catalyst particles (e.g. about 5 micron average diameter) in tetrafluoroethylene for the carbon layer, and applying the slurry in a suitable layer (e.g. about 0.003 inch thick) on the free side of the screen. The composite is then sintered, for example, at about 330° C. Other methods of providing a suitable negative electrode 28 can be utilized in accordance with known prior art relating to metal-hydrogen electrochemical cells. Cell stack 14 also includes a pair of disc-like liquid porous separators 32 in the form of sheets 34 preferably selected from the group consisting of chemically inert polymeric materials, fiberglass, and mixtures thereof, capable of absorbing and retaining the electrolyte used in the cell, namely, an aqueous solution of sulfuric acid (not shown). The sulfurice acid can have, for example, a concentration of about 1.1 to about 1.3 Kg/liter, preferably about 1.2 Kg/liter.

Cell stack 14 further includes a pair of disc-like gas screens 36, preferably comprising in each instance an expanded sheet 38 of porous polymeric material, such as polypropylene, polyvinyl chloride or the like. Negative electrodes 28 in cell 14, may, for example, each have the following dimensions: thickness 0.006 inch; diameter 3.0 inch. Separators 32 may, for example, each have the following dimensions: thickness 0.045 inch; diameter 3.1 inch. The gas screens may, for example, each have the following dimensions: thickness 0.025 inch; diameter 3.1 inch.

It will be noted from FIG. 1 that each negative electrode 28 has a separator 32 against one side thereof and a gas screen 36 against the opposite side thereof. It will also be noted that there is a separator 32 between positive electrode 24 and each negative electrode 28.

Retainer 16 comprises a pair of horizontal end plates 40 and a vertical core 42, preferably of plastic, ceramic, hardened rubber or the like electrically insulative material. Core 42 has a horizontal expanded base plate 44 and a threaded upper end 46 around which a washer 48 and nut 50 are secured. The components of stack 14, namely, positive electrode 24, negative electrodes 28, separators 32 and gas screens 36, in addition to horizontal end plates 40, washer 48 and nut 50 are each provided with a central vertical opening (not shown) so that they are vertically stacked on core 42 as shown in FIG. 1. An enlarged tie ring 52, the diameter of space 22, is disposed between washer 48 and the upper end of upper end plate 40 and is welded at its outer periphery to side wall 18 of vessel 12 so as to hold stack 14 in place, as shown in FIG. 1. A lead 54 is connected to positive electrode 24 and to a terminal 56 secured to one end 56 of vessel 12. Terminal 56 is electrically insulated from vessel 12 by insulation 60. A fill tube 62 passes through terminal 56 to permit hydrogen gas 20 to be introduced into space 22. It will be understood that tube 62 could, instead, be at the opposite end 68 of vessel 12, if desired. A pair of leads 64 are secured to negative electrodes 28 and pass to a terminal 66 connected to opposite end 68 of vessel 12. Insulation 60 similarly electrically insulates terminal 66 from vessel 12.

A test cell of the configuration set forth in FIG. 1 and described above, was made up, utilizing 5 N aqueous sulfuric acid, and 1 atmosphere of hydrogen. Platinum was used as the catalyst in a concentration of about 73 weight percent disposed as a film on a U.S. Standard mesh nickel wire screen embedded in 3 mil film of tetrafluoroethylene for each of the two negative electrodes. These electrodes had been sintered at 330° C. and were 0.006 inch thick and of 3.1 inch diameter. The positive electrode was a 0.055 inch thick sheet of PbO$_2$ which had been dry charged. The separators were 0.045 inch thick sheets of fiberglass wool and the gas screens were 0.025 inch thick expanded porous polypropylene gas screens. The following results were obtained:

TABLE I

| | Condition/Action | | Voltage (V) |
|---|---|---|---|
| 1. Flooded | (a) open circuit | | 1.368 |
| | (b) charging @.1A | | 1.78 |
| | (c) open circuit | | 1.658 |
| | (d) plus 16 hours | | 1.655 |
| 2. Semistarved w/H$_2$ ATM | | | |
| | (a) open circuit | | 1.657 |
| | (b) discharge @ .1A | 1 min. | 1.612 |
| | | 2 | 1.609 |
| | | 5 | 1.604 |
| | | 10 | 1.592 |
| | (c) discharge @ .2A | | 1.557 |
| | .5 | | 1.470 |
| | .7 | | 1.415 |
| | .6 | | 1.440 |
| | | 1 min. | 1.413 |
| | | 2 min. | 1.393 |
| | (d) 16 hours on open circ. | | 1.64 |

Following this, the cell was soaked with electrolyte for a second time and the excess drained. The cell was then charged at 0.17A for 3 hours and discharged at 0.25A. The resultant data generated is tabulated below.

TABLE II

| Condition/Action | | Voltage (V) |
|---|---|---|
| (e) charge @ .17A | 1 hr. | 1.802 |
| | 2 hr. | 1.824 |
| | 3 hr. | 1.853 |
| (f) discharge @ .25 | 1 hr. | 1.659 |
| | 2 hr. | 1.627 |
| | 3 hr. | 1.594 |

TABLE II-continued

| Condition/Action | Voltage (V) |
| --- | --- |
| 4 hr. | 1.000 |

The cell was then charged at 0.3A for 4 hours and then discharged at 0.6 and 0.3A to exhaustion. Table III below sets out the test results and FIG. 2 displays the results.

TABLE III

| Condition/Action | | Voltage (V) |
| --- | --- | --- |
| (g) charge @ .3A | 1 hr. | 1.861 |
| | 2 hr. | 1.889 |
| | 3 hr. | 1.926 |
| | 4 hr. | 1.973 |
| (h) discharge @ .6A | .5 hr. | 1.618 |
| | 1.0 hr. | 1.566 |
| | 1.5 hr. | 1.496 |
| | 2.0 hr. | 1.350 |
| (i) discharge @ .3A | .5 hr. | 1.485 |
| | 1.0 hr. | 1.350 |

The test results indicated the improved performance of the test cell in comparison to other inexpensive cells under the testing conditions.

FIG. 3

Figure 4:
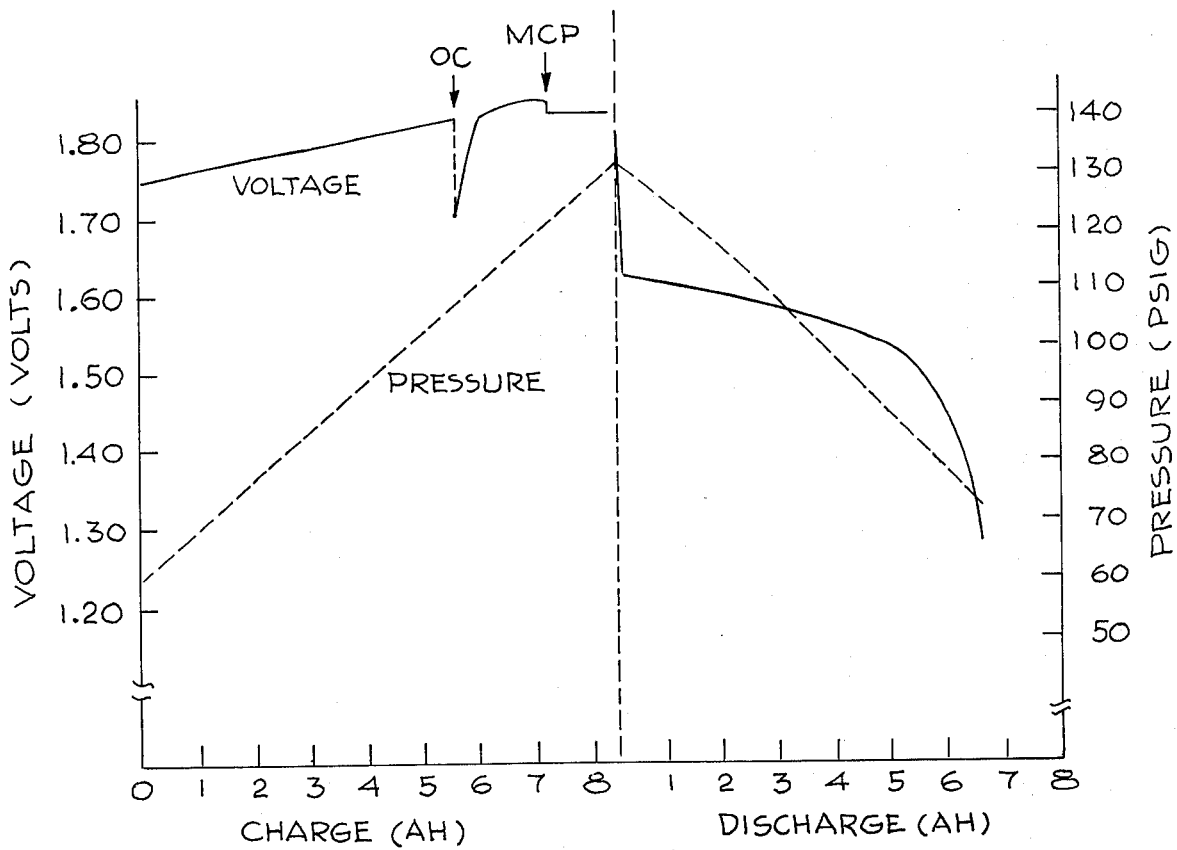
FIG. 4 is a graph depicting the voltage, current and pressure characteristics of the cell of FIG. 1 but employing multiple stack elements exemplified in FIG. 3; and, FIG. 5 is a schematic, fragmentary cross section of a third preferred embodiment of the cell stack utilized in the lead-hydrogen electrochemical cell of the present invention.
Figure 3:
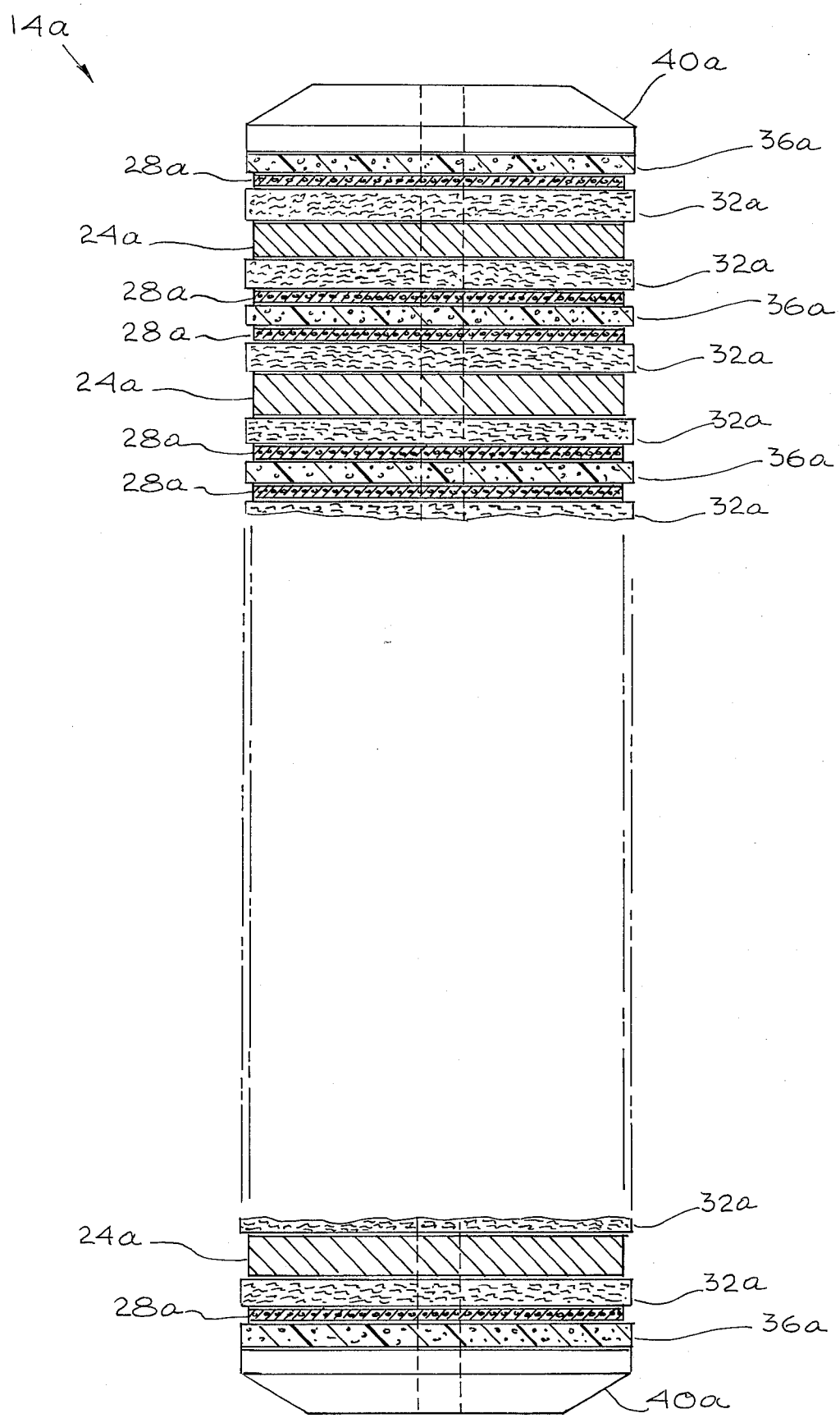
FIG. 3 is a schematic, fragmentary cross section of a second preferred embodiment of the cell stack utilized in the lead-hydrogen electrochemical cell of the present invention.

A second preferred embodiment of the cell stack utilizable in the improved cell of the present invention is schematically depicted in FIG. 3. Thus, a cell stack 14a and end plates 40a are shown. Stack 14a and end plates 40a are utilizable in place of stack 14 and end plates 40 illustrated in FIG. 1. Components of stack 14a similar to those of stack 14 utilize the same numerals but are succeeded by the letter "a". Thus stack 14a comprises a series of repeating units, each unit consisting of a lead dioxide positive electrode 24a, a pair of positive electrodes 28a, a pair of gas screens 34a and a pair of separators 32a arranged as previously described for stack 14. The separating units are stacked one on another and there may be any suitable number of such units. It will be understood that for each such unit leads (not shown) run to each of positive electrodes 24a and to each of the negative electrodes 28a and that end plates 40a are secured to other retaining components (not shown) in a pressure vessel (not shown), to opposite ends of which the leads are connected. Such pressure vessel contains a hydrogen atmosphere (not shown) and is sealed. Stack 14a operates in the manner of stack 14, having electrolyte (not shown) in the form of aqueous sulfuric acid solution disposed in separators 32a. A typical charge-discharge cycle from such a cell is shown in FIG. 4.

FIG. 5

Figure 5:
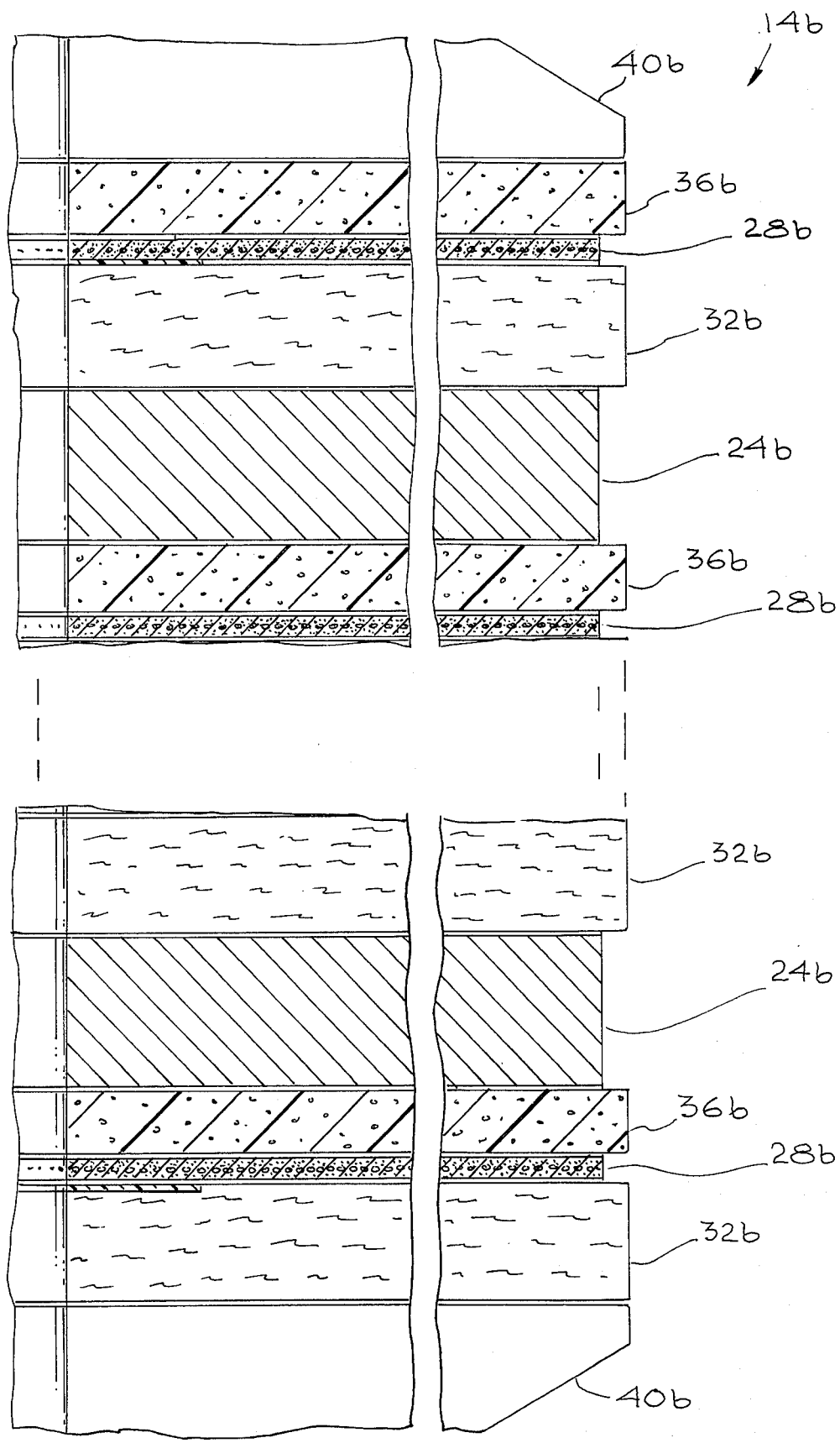

A third preferred embodiment of the cell stack utilized in the improved cell of the present invention is schematically depicted in FIG. 5. Thus, cell stack 14b is shown. Components thereof similar to those of cell stack 14 bear the same numerals as cell stack 14 but are succeeded by the letter "b". End plates 40b are also shown. Stack 14b and plates 40b can be substituted for stack 14 and plates 40, if desired, in cell 10. End plates 40b are also shown. Stack 14b differs only from stack 14 and 14a in the particular arrangement of components within each repeating unit. Thus, in the upper portion of FIG. 4, end plate 40b is shown, against the bottom portion of which gas screen 36b is disposed. Next lower in the stack is negative electrode 28b, followed by separator 32b, positive electrode 24b, gas screen 36b and negative electrode 28b. In the lower end of FIG. 4, there is shown a stacking sequence wherein the uppermost member of the stack is separator 32b, below which appear in sequence electrode 24b, gas screen 36b, negative electrode 28b and separator 32b, the latter resting on end plate 40b.

Each negative electrode 28b may comprise, for example, a thin film (e.g. 3 mil) of polytetrafluoroethylene, one side of which has a gold plated nickel grid imbedded therein, the free side of the grid having a layer of catalyst particles, such as platinum, bonded together with tetrafluoroethylene and adhering to the grid and, through the pores thereof, to the tetrafluoroethylene film. The composite electrode 28b has been sintered during manufacture. An insulating ring 70 may be disposed between a portion of the negative electrode and the separator in each repeating unit in stack 14b, as shown in FIG. 4.

Cell 10 can function satisfactorily using cell stack 14, 14a or 14b with suitable modifications to provide the necessary electrode leads, etc. In each instance the improved electrochemical cell of the present invention provides high performance at low cost over a long period of time. The high voltage, long cycle life (limited only by the head dioxide electrode) long calendar life, maintenance-free operation at high specific energy and with a dry charge capability render the present cell a substantial improvement over the art. The cell is of sufficiently low cost to make it useful for commercial terrestrial application. As with other metal-hydrogen systems, there is a continuous state of charge indication. The volumetric energy density is about 25 and 50% greater than the nickel-hydrogen and silver-hydrogen cells, respectively.

Various modifications, changes, alterations and additions can be made in the improved electrochemical cell of the present invention, its components and its parameters. All such modification, changes, alterations and additions as are within the scope of the appended claims form part of the present invention.

What is claimed is:

1. An improved rechargeable lead-hydrogen electrochemical cell, said cell comprising, in combination:
   a. a cell stack including
      i. a positive electrode comprising lead oxide,
      ii. a pair of gas-porous negative electrodes containing catalyst for said cell,
      iii. an electrolyte comprising aqueous sulfuric acid,
      iv. a pair of separators, and,
      v. a pair of gas screens, each of said negative electrodes having one of said separators disposed on one side thereof and one of said gas screens disposed on the opposite side thereof, said electrodes and separators containing said sulfuric acid;
   b. retaining means secured to and supporting said cell stack;
   c. a pressure vessel disposed around and spaced from said cell stack and said retaining means, said pressure vessel containing inlet means and electrical leads connected to, respectively, said positive and negative electrodes; and,
   d. hydrogen gas disposed within said pressure vessel.

2. The improved electrochemical cell of claim 1 wherein said catalyst is selected from the group consisting of platinum, palladium, and mixtures thereof, and said positive electrode comprises a sheet of lead dioxide.

3. The improved electrochemical cell of claim 1 wherein each of said negative electrodes comprises pure activated carbon.

4. The improved electrochemical cell of claim 2 wherein each of said negative electrodes comprises a thin gas-porous sheet of hydrophobic polymer to one side of which are connected a metallic wire screen and a hydrophilic layer containing said catalyst dispersed therein.

5. The improved electrochemical cell of claim 1 wherein said separator comprises material selected from the group consisting of polymeric material, fiberglass and mixtures thereof.

6. The improved electrochemical cell of claim 2 wherein said gas screen comprises an expanded sheet of polymeric material.

7. The improved electrochemical cell of claim 6 wherein said gas screen comprises polypropylene and said separator comprises polyvinylchloride.

8. The improved electrochemical cell of claim 2 wherein each of said negative electrodes comprises a sintered composite of a gas porous sheet of hydrophobic tetrafluoroethylene, in one side of which is embedded a nickel plated with gold or platinum wire screen, a thin layer of hydrophillic carbon particles bearing said catalyst being disposed on the free side of said wire screen.

9. The improved electrochemical cell of claim 4 wherein said screen comprises gold plated nickel and wherein said hydrophilic layer comprises particles of said catalyst held together by a polymeric binder, said layer being secured to said wire and through openings therein to said hydrophobic layer.

10. The improved electrochemical cell of claim 1 wherein said hydrogen is present in said vessel at cell start-up at about atmospheric pressure, wherein said aqueous sulfuric acid is about 5N, wherein said lead oxide is lead dioxide and wherein said catalyst comprises platinum in a concentration of about 4 mg/cm$^2$.

* * * * *